| DIMENSION | MAX. | MIN. |
|---|---|---|
| A | 2.5 | 1.8 |
| B | 2.5 | .8 |
| C | 3.0 | .5 |
| D | 8.0 | 3.5 |
| E | 6.0 | 2.0 |

| ANGLE | MAX. | MIN. |
|---|---|---|
| $\delta_F$ | 65° | 50° |
| $\delta_V$ | 45° | 30° |

Benjamin W. Badenoch
INVENTOR.
BY Edwin Coates
ATTORNEY

Benjamin W. Badenoch
INVENTOR.
BY Edwin Coates
ATTORNEY

Benjamin W. Badenoch
INVENTOR.

Patented Aug. 15, 1950

2,518,854

UNITED STATES PATENT OFFICE 2,518,854

WING HIGH LIFT FLAP DEVICE

Benjamin W. Badenoch, Los Angeles, Calif., assignor to Douglas Aircraft Company, Inc., Santa Monica, Calif.

Application June 14, 1943, Serial No. 490,935

16 Claims. (Cl. 244—42)

This invention relates to an aircraft wing structure of novel design. A wing structure of the invention serves in several respects to improve the all-around performance of an airplane. It consists of a combination of interrelated airfoil elements, including a flap, which constitute the wing or supporting surface of the airplane and which are so arranged with respect to one another in each flight regime as to give improved flight characteristics over those attainable with known wing structures having flaps.

In general, the attainment of the improvements in flight performance secured by this invention requires that one or all of several adjustments of the wing structure or supporting surface be possible. These adjustments should provide for the following flight characteristics: (1) a minimum drag in the high speed regime; (2) a low drag during climbing, low speed, long range or endurance flying, flight to ceiling (i. e. slow climb in low density atmosphere), or at any other time when the lift coefficient is substantially above that required for high speed; (3) a temporarily greatly increased drag in any regime of flight, but particularly during dives such as in dive-bombing or in combat when it is desired to reduce speed quickly, or to reduce speed during descent preparatory to landing; (4) an increased available maximum lift coefficient without a large increase in drag, and with as small an increase in moment coefficient as possible for use in flight regimes where an improved maximum lift coefficient improves performance such as in landing, take-off, minimum radius turns and low speed maneuvering in general; (5) adjustability of the attitude of the airplane relative to its flight path at any given speed for use in aiming guns which are fixed in the airplane or for improved visibility or for improved bomb or torpedo dropping conditions. These flight characteristics must be attained by adjustments which are made without any marked detrimental effects on the flying qualities of the airplane, such as a large change in longitudinal trim, or a change in stability or control characteristics.

It is therefore an object of this invention to provide a wing structure, adjustable to secure improved flight characteristics in other regimes, which does not have wing drag during high speed flight regime appreciably greater than that otherwise attainable.

It is a further object of this invention to provide a wing structure adjustable for lowering the drag of the wing at the low speed, medium value, lift coefficients, which are higher than the lift coefficients for the minimum drag of high speed flight.

It is a still further object of this invention to provide a wing structure adjustable to increase the drag of the wing at any lift coefficient without appreciably altering other airplane characteristics such as attitude relative to the flight path at a given speed, or longitudinal trim, or stability.

It is a still further object of this invention to provide a wing structure adjustable to increase the available maximum lift coefficient without a large increase in drag and with as small an increase in moment coefficient as possible.

It is a still further object of this invention to provide a device for adjusting the longitudinal attitude of the airplane relative to its flight path at any speed.

In order to obtain the first objective the wing structure must, when in the high speed position, present a minimum number of spanwise breaks or openings in the wing surface. These openings must be of minimum width and they must be located well aft on the airfoil, particularly if the airfoil is designed to maintain a laminar boundary layer extending relatively far aft. In this latter case, the openings must be aft of the point where the laminar boundary layer changes to turbulent because otherwise the openings will interrupt the laminar boundary layer and cause this transition. In a wing structure of this invention there are only two spanwise openings, one on the upper surface and one on the lower surface of the structure. By proper design, both openings will be narrow. Ordinarily the upper surface opening will be aft of 80% of the wing chord measured from the leading edge and the lower one will be at about 75% wing chord. Both of these wing chord stations are well aft of the usual laminar flow boundary layer region. A particular feature of the invention is that of the complete concealing enclosure of an interfoil, used in other regimes, between a main wing airfoil and a trailing flap when the wing structure is adjusted for the high speed regime.

As to the second object of the invention, when an airfoil is designed for minimum drag at a given speed or within a given speed range, ordinarily the profile drag will be considerably higher during the flight regimes involving slower speeds which require higher lift coefficients. These flight regimes generally include climbing flight, flight at speeds for long range or endurance, and flight to the ceiling of the airplane. If the airfoil structure includes a device which can be adjusted to give an effective increase in airfoil camber, the minimum drag characteristics of the airfoil can be made to occur at the lift coefficients corresponding to these slow speed regimes, thereby bettering the performance in these regimes. This is particularly true of airfoils which depend on a laminar boundary layer over a considerable portion of their chord for their minimum drag. If this type of airfoil is designed to maintain a laminar boundary layer in the high speed range, ordinarily the extent of the laminar boundary layer will be greatly diminished in the slow speed regimes. By effectively increasing the camber of the airfoil, the range of lift coefficients over which the laminar boundary layer is fully maintained is increased to include the lift coefficients corresponding to the slow speed flight regimes, resulting in exceptionally low drag. The wing structure of this invention accomplishes this result by providing for the downward deflection of a flap which in the high speed adjustment is in a faired, slot-closing contour-continuing relation to the wing and in the slow speed adjustment is rotated downwardly without opening a slot of any substantial width. The angle of deflection varies directly as the lift coefficient for which minimum drag is desired.

It is desirable that such a deflectively rotatable flap extend along the entire span of the wing in order to reduce the drag of all of the wing area, to eliminate any increase in drag due to a distorted lift distribution caused by rotating a flap extending over only a portion of the span, and to increase the lift coefficient attainable with a given drag. It is obvious that if the deflectable flap extends full span, it must occupy the place of the usual aileron and must itself be capable of affording some means of lateral control. Therefore the flaps on right and left wings are so mounted on the wing and so controlled in this invention that they may rotate either upward or downward from any neutral position, but in opposite directions to each other in a manner similar to that of a conventional aileron, thereby providing lateral control.

With reference to the third object of the invention stated above, when an increase in drag without an appreciable change in attitude or change in longitudinal trim is desired, the wing structure of the invention is so constructed that the flap may be extended bodily to a position of aft displacement from the wing and concomitantly be rotated about a spanwise axis to deflect its trailing edge upwardly at any angle relative to the chord line of the wing according to the increase in drag desired. Wind tunnel tests have shown that when the flap is deflected upwardly at angles from 10° to its initial position as part of the wing, up to approximately 60°, the drag is increased nearly linearly with this flap angle of upward deflection, whereas the pitching moment coefficient and the angle of attack for a given lift coefficient is nearly unchanged. Typically, there is obtained a maximum increase in section drag coefficient of .27 accompanied by a 1° reduction in angle of attack for a given section lift coefficient and a change of section pitching moment coefficient of +.04, compared to the section characteristics with the flap retracted. Ordinarily this feature of the invention is used only in connection with the control of flaps over the inboard portion of the wing span. The flaps of the outboard portion of the span are thus available for lateral aileron control and for downward deflection to reduce drag as previously described and, as will appear later, to increase the maximum lift while at the same time maintaining lateral control.

With reference to the fourth object of the invention stated above, that of causing an increase in available maximum lift coefficient without a large increase in drag and with as small an increase in moment coefficient as possible, there are two general means of accomplishing this end, (1) increasing the effective area of the wing, and (2) increasing its effective camber. If an increase of area is accomplished without an increase in camber or with a slight decrease in camber, the maximum lift coefficient is increased approximately in proportion to the area increase with little drag and moment increase. However, as the possible amount of area extension of the wing is limited, this means of increasing the available maximum lift coefficient must be augmented in order to attain the values of maximum lift coefficient currently required for the flight regimes of landing, take-off, small radius turns and low speed maneuvering. If a lift coefficient increase obtained by extending the wing area is augmented by curving the extended portion down and increasing the effective camber, a higher maximum lift coefficient is obtainable but the moment increase is inordinate because of the fact that the additional lift on the extended area has a long arm about the usual moment center at approximately 25% of the original chord. Consequently, when these higher maximum lift coefficients are required, it has been one practice in order to secure a maximum lift coefficient for a given moment, to substitute increased effective camber for the increase in area and thereby bring the highly loaded aft portion of the airfoil in closer to the moment center. This result has been accomplished to a limited extent by many types of well-known flaps, aileron type flaps, split flaps and slotted flaps. In each of these cases the wing airfoil structure consists of two components, the fixed portion of the airfoil or wing proper and the movable flap.

The slotted flap has proved to be the best of the two component combinations, but the maximum lift attainable from it is limited by the camber increase it can effect without causing the airflow over the flap to separate from the flap surface.

By the addition, in accordance with this invention, of a third component which may be called the interfoil, and by the proper interrelation of the three components, i. e. the fixed airfoil or wing proper, the interfoil and the flap, wind tunnel tests show that the section maximum lift coefficient of this class of airfoils is raised about .55 above the best value of maximum lift coefficient hitherto attained with a slotted flap. From the standpoint of moment, for a given lift coefficient this three component combination is equal to the slotted flap. From the standpoint of drag at high flap angles it is superior because the proper interrelation of the three components prevents separation of the air flow from any component, whereas the flow is ordinarily partially separated from the upper surface of a slotted flap at high flap angles. This airflow separation causes high drag.

Certain three component combination airfoils have, however, been known to the art for some time. There are two types in particular, the type having the double slotted flap and the type having the slotted deflector flap. The double slotted flap type is, as the name implies, an airfoil with two slots cut through it between its upper and lower surfaces, the airfoil component between the two slots and the flap aft of both the slots being so arranged and mounted as to move relative to one another and relative to the forward fixed airfoil. The two main objections to this type of three component airfoil are that the second slot causes an additional drag in the high speed configuration, and the combination requires a complicated mechanism. The slotted deflector flap type makes use of a small "guide vane" or "deflector plate" carried by the flap or the fixed airfoil the main purpose of which is to guide the air through the slot and down along the top surface of the flap, preventing separation.

In this invention, the third component or interfoil is longitudinally movable relative to both fixed airfoil and flap. It is so designed and its movements so controlled that it is a powerful device for increasing the effective camber of the airfoil-interfoil-extensible flap combination when required, without causing any increase in drag in the high speed configuration. In addition to preventing separation on the fixed airfoil and on the extended flap, which elements in turn prevent separation on the interfoil, the interfoil adds greatly to the lift of the entire combination at any given angle of attack by loading up the fixed airfoil, thereby effectively increasing the camber. In the following detailed description of the wing structure and its operation, it will be evident that the interfoil has no permanent fixed relationship to either the flap or the airfoil. In the high speed configuration it is completely stowed within the airfoil adjacent to the nose of the flap to save space within the airfoil. When the flap is extended, the interfoil takes up a fixed position relative to the fixed airfoil while the flap may be deflectively rotated about a pivot axis. In some aircraft designs it may be preferable to mount the interfoil for movement relative to both the fixed airfoil and the flap in coordination with flap deflection. When the fixed airfoil, interfoil and flap are properly interrelated the section lift coefficient at a given section angle of attack is increased as much as .9 over that for the best slotted flap combination without the interfoil, thus demonstrating the power of the latter in increasing the effective camber. The proper interrelation of the three components for best maximum lift is quite critical and will be further considered below.

With reference to the fifth mentioned object of the invention, that of controlling the attitude of the airplane relative to the flight path, that is, the angle of attack, at any given speed, the attainment of this object by the invention is demonstrated by the ability of a wing structure of the invention to cause a change in the angle of attack of the airplane for a given speed by as much as 23.5° when a full span flap is extended and deflectively rotated downward at an angle of 55° to the wing chord line. The attitude for a given speed can be controlled by controlling the flap angle. Using a partial span flap the change in attitude is correspondingly less.

It is a still further object of the invention when the flap, or flap and interfoil of the invention are full span, to provide for lateral or aileron control regardless of the position of the flap from the standpoint of its extension or its rotative deflection. The provision for lateral control by moving the outer portion of the flap span as an aileron when the flap is retracted has already been discussed. When the flap is extended and rotated to any angular position whatever, that angular position is the neutral position for an upward aileron motion of the flap on one side of the airplane and a downward aileron motion of the flap on the other side of the airplane producing a rolling moment which is comparable to that for similar aileron motion when the flap is retracted.

The advantage of this feature of the invention arises from the inability of known flaps by means of an aileron movement thereof to apply a rolling moment to an aircraft when the neutral flap position is at a high angle of downward deflection which is comparable in value with the rolling moment from the same aileron movement when the neutral flap position is more nearly in chord alinement with the wing. The reason for this lies in the high angle of these known flaps in their down positions to the airflow impinging upon them which promotes air separation and general ineffectiveness of the flaps when used as ailerons. With these types the high angles of downward deflection are required for the desirable increase in maximum lift.

However, when the flap of a wing structure of this invention is extended and rotated downward, the interfoil intercepts and directs the air in such a manner that the lift coefficient is greatly increased, even at small angles of downward deflection of the flaps. This air deflected by the interfoil flows aound the flap at a relatively small angle to the flap when compared to known flaps. In addition the interaction of the fixed airfoil, the interfoil, and the flap prevents separation on any one of these elements which results in an equal rolling moment from an aileron motion of the flap whether it is retracted, or extended and rotated downward.

It is another object of the invention to provide in one wing structure the means of attaining various combinations of two or more or all of the objects above described, as a result of the design, the interrelation and controllable adjustability of its several airfoil components.

The word "aileron" when used herein as an adjective, as in the expressions "aileron fashion" or "aileron motion," refers to rotation in opposite angular directions on the two sides of the plane. In contradistinction, the expression "lift varying" refers to rotation in the same angular direction on opposite sides of the plane.

In the drawings which are for illustrative purposes only.

Figure 1:
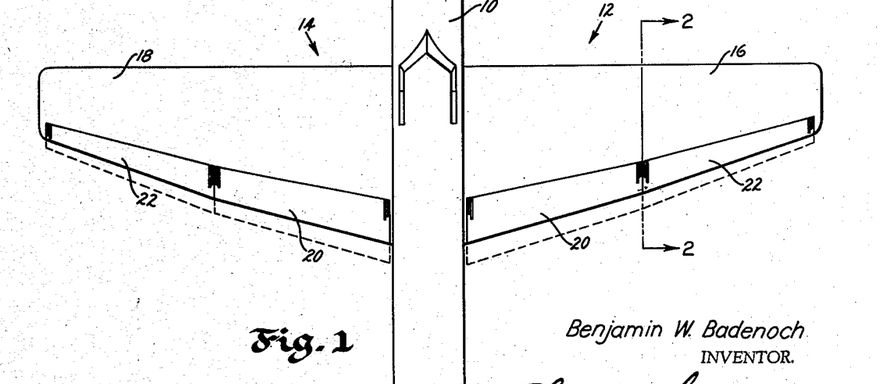
Figure 1 is a plan view of an airplane having a wing structure embodying the invention.

Figure 1 of the drawings shows an airplane, having a fuselage 10 and a complete wing structure comprising a right wing structure 12 and a left wing structure 14. The main airfoil or wing proper of the right wing structure is designated by the numeral 16 and the corresponding airfoil of the left wing structure is designated by the numeral 18.

Each of the wing structures 12 and 14 has an inboard flap 20 and an outboard flap 22 which are so mounted on the wing structures that they are rotatable over a limited arcuate range on a spanwise axis when in the retracted position shown in full lines in Figure 1, and may be projected rearwardly to an extended position shown in dotted lines on Figure 1, in which extended position the axis of rotation is displaced rearwardly and preferably somewhat downwardly from its initial retracted full line position and in which extended position the flap is also rotatable over a limited arcuate range on its axis.

Figure 2:
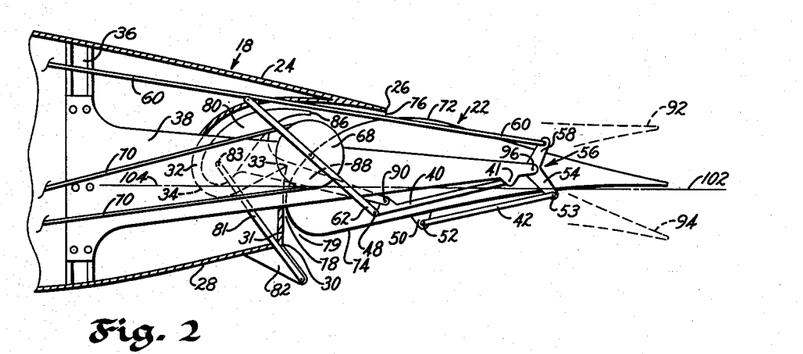
Figure 2 is a sectional view of the trailing portion of a wing structure on one side of the plane in the retracted position, taken as indicated by the line 2—2 of Figure 1.

Figure 2 shows the manner in which the flap 22 is mounted on the wing 18, it being understood that the wing structure 12 on the other side of the plane has similar and similarly mounted and related parts. The inboard and outboard sections of the wing structure are also of the same general construction and arrangement, the principal difference between the sections lying in their respective control mechanisms. Since this difference does not appear in any of the parts or mechanism shown in Figure 2, this figure serves to illustrate the construction of both outboard and inboard sections of the wing structure.

The wing 18 has an upper surface 24 terminating aft in a lip 26 and a lower surface 28 terminating aft in a lip 30 which is, in the preferred arrangement shown in the drawing, at a chordwise station substantially in front of the lip 26. A spanwise surface 31 extends upward from lip 30 to an upper lip 33, the surface 31 serving to close the opening between the wing 18 and the flap 22 when the flap is in retracted position. Between the surfaces 31 and 24 and extending forwardly from the lips 26 and 33 is a spanwise recess 32 which may have a forward spanwise wall 34 or may simply be the aft part of the wing interior chamber.

To a frame member 36 of the wing 18 are bolted two or more spanwise-spaced, aft-extending frame beams 38 for supporting the flap 22. There will, of course, be at least two of these frame beams adjacent the two ends, respectively, of each flap length, it being understood that there may be one or more flap lengths to either the inboard or outboard sections of the flap on each side of the plane.

The flap 22 is supported on each beam 38 by means of two links 40 and 42 and the toggle links 62 and 64. The link 40 is pivotally connected at its upper outer end at 41 to the beam 38 near the aft end thereof and is pivotally connected at its lower end to the flap 22 on a pivot axis 48 intermediate the leading and trailing edges of the flap and substantially removed from either edge and below the median line of the flap, it being understood that this link as well as the other members of the flap support are disposed in chordwise slots and openings in the flap surfaces, provided where structurally required. The link 42 is pivoted at its lower end to a bracket 50 on an axis 52 below the lower flap surface and substantially aft of the axis 48 and is pivoted at its upper aft end at 53 to a lower arm 54 of a bell crank 56 which is in turn pivoted to the aft end of the beam 38 at 96. The upper arm 58 of the bell crank 56 is pivotally connected to a control rod 60 which extends forward within the wing 18 and which is movable by the control devices of the wing structure in a manner hereinafter described. If the control rod 60 is stationary, it is obvious that if the pivot axis 48 is also held stationary with respect to the wing 18, the flap will be stationarily positioned with respect to the wing 18. The pivot axis 48 is thus held stationary by pivotally connected links 62 and 64 which form a closed toggle between the pivot axis 48 and the hub of a sheave 68 which is mounted on frame beam 38 for rotation in either direction by control cable 70 in a manner to be later described.

With the links 62 and 64 and with the bell crank 56 in the positions shown in Figure 2, the flap 22 is disposed with its leading edge closely adjacent the surface 31 and with its upper surface 72 and its lower surface 74 forming openings 76 and 78 respectively with the lip 26 and surface 31 of very small width and forming faired contour-continuing surfaces of the wing surfaces 24 and 28 respectively. This is the high speed regime position for the flap 22. The small opening 76 and the gap 79 between the lip 30 and the under surface of the flap create no appreciable drag. The design of the wing and flap should be such that in Figure 2 position these openings are both aft the laminar flow boundary layer of the upper and lower wing surfaces respectively.

An interfoil 80 is movably mounted on the main airfoil 18. The interfoil is of airfoil section as shown, having an upwardly bowed median line and a downwardly curved aft lip 86. A link 81 shown in Figure 2 is one of two or or more, each of which connects a bracket 82 projecting downward from the wing 18 with the leading end portion of the interfoil 80, so that the axis 83 of the pivotal connection with the interfoil may move in an arcuate path about the bracket 82. The interfoil is also connected to the wing structure by a plurality of arms 88 each of which is fixedly secured at its forward end to the interfoil and is pivotally connected at its other end to a bracket near the forward end of the associated link 40 on an axis 90. This interfoil, which is provided for use in connection with other positions of adjustment of the flap 22 than the high speed regime position shown in Figure 2 is, when the flap is in the Figure 2 position, entirely contained within the recess 32 with its leading and trailing edges spaced substantially inwardly from the upper and lower surfaces of the wing structure and from the openings 76 and 78. In this Figure 2 position, then, the interfoil is not only designedly incapable of fulfilling any aerodynamic purpose, but it can work no aerodynamic harm, being removed from engagement with any airflow.

When wing and flap on one side of the airplane are in the Figure 2 position, the control of rods 60 and cables 70 on the two sides of the airplane is, as usual, such that the wing and flap on the other side of the airplane are also in the Figure 2 position. The control system is also such, as will be later brought out, that the outboard flap sections on each side of the airplane may be given oppositely directed up and down movements of aileron character about their axes 48 for roll control of the airplane, by causing oppositely directed movements of the rods 60 on the two sides of the airplane. These aileron positions are indicated by the dotted line representations of the flap designated by the numerals 92 and 94 respectively. The axes 48, and the axes 96 of the bell cranks 56 remain stationary, and forward or rearward movement of the bell crank arm 54 swings the trailing end of the flap 22 correspondingly upward or downward about axis 48. In these positions 92 and 94, the openings 76 and 78 remain of inconsequential width, because of the shape of the wing surface 31 and of the flap nose and because of the position of the axis 48.

For the second class of flight regimes described above, i. e., slower speed regimes, requiring moderately high lift coefficient in which low drag is, of course, desirable, the flaps on both sides of the plane may be deflectively rotated downwardly together on their axes 48 by causing appropriate simultaneous rearward movements of the rods 60 by the airfoil control system of the plane as later described. The neutral position of the flap from an aileron standpoint is thereby lowered to the full-line position 22a of Figure 3. The angle of deflection of the flap required for providing low drag in the slower speed regimes is not of a magnitude great enough to impair the lateral control which is effected when the flap on one side is moved upward and that on the other side is moved downward in aileron fashion from this position of deflection as neutral. This is particularly true for a full span flap arrangement such as is shown in Figure 1, since with a full span flap it is unnecessary to shorten the portion of the span used for lateral control, as is necessary with partial span flaps in order to provide a flap span, inboard of the lateral control, adequate for lift control. In the arrangement of this invention in which the flap itself is used as an aileron, a relatively long span of outboard flap may be used for lateral control without appreciably lessening the angle of downward deflection required for maximum lift. The relatively long flap span capable of aileron movement will provide adequate lateral control with aileron movement of relatively small amplitude. When to this relatively small downward aileron movement (e. g. 12°) is added the flap deflection to reduce drag at low speeds (e. g. 10°) the total angle is ordinarily within the range of flap angles which may be employed without danger of air separation on the flap, such as would impair lateral control. The numerals 98 and 100 designate aileron positions of the flap when deflected from the neutral position 22a for roll control.

Figure 3:
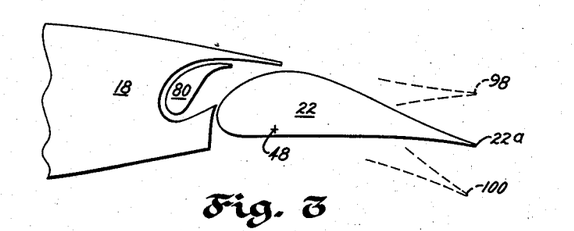
Figure 3 is a diagrammatic view of the wing structure of Figure 2 with the flap in a downwardly deflected position.

In both of the neutral positions of the flap shown in Figures 2 and 3 and in other neutral positions and during aileron movements from these neutral positions, the interfoil remains stationary with relation to the wing 18 because the arm 40 to which the interfoil is pivoted at 90 is held stationary by its pivotal connection to the frame bar 38 at 41 at one end and the link 62 at 48 at the other end, the link 62 being stationary except when sheave 68 is rotated.

Because of the shape of the leading end portion of the upper surface 72 of the flap, which is generally arcuate in cross section about the axis 48 as a center, the small openings 76 and 78 remain substantially constant in width during the downward deflection of the flap 22.

The flap 22 may be bodily shifted in a generally aft and preferably also substantially downward direction by counter-clockwise rotation of the sheaves 68 effected by movement of the cables 70 in the operation of the control system of the wing structure in a manner to be later described. Rotation of the sheaves 68 and links 64 secured thereto from the position of Figure 2 through approximately a half circle in a counterclockwise direction to the position shown in Figure 4 thrusts the links 62 downward. Link 64 does not show in Figure 2, being hidden by the upper end of link 62. The flap 22 moves rearward and downward, controlled in its movement by the substantially parallel links 40 and 42, the effect being to maintain the chord line 102 of the flap substantially parallel to its initial position in which it is a part of the chord line 104 of the entire airfoil, since the line connecting axes 41 and 53 is substantially parallel to the line connecting axes 48 an 52. In other arrangements, in which links 40 and 42 are designedly not parallel, the chord line of the flap 102 is rotated while extending, arriving at some desired angle when extension is complete.

As the flap moves aft and downward the arms 88 hinged to the links 40 pull the interfoil aft, the forward end of the interfoil being guided rearward through an upwardly bowed arc by the link 81. It will be observed that in Figure 4, at the end of the rearward extension movement of the flap, the forward portion of the interfoil is disposed vertically below and substantially spaced from the lip 26 of the wing with the lip 86 of the interfoil directed downward so that a line tangent to its upper surface makes an angle preferably of about 45° with the wing chord line, the trailing edge of the lip 86 being approximately vertically above the axis 48, and substantially spaced from the upper surface of the flap.

Figure 4:
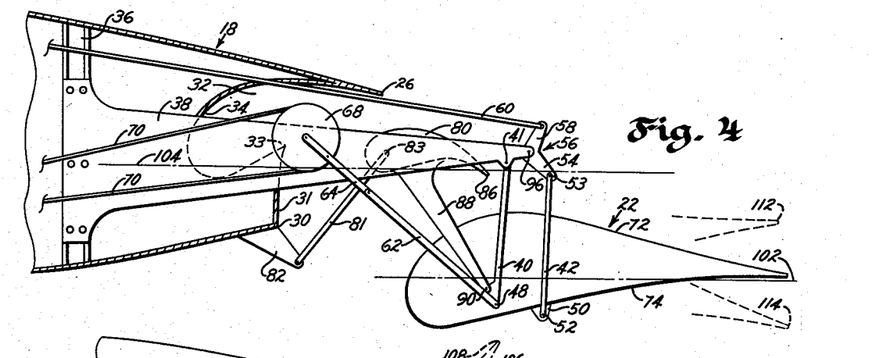
Figure 4 shows the same wing structure with the flap in extended position and without downward deflection.

While the flap may, under some circumstances, be held in the position of adjustment shown in Figure 4, the pilot or an automatic feature of the control system may rotate the flap 22 on its axis 48 by movement of the control rod 60 either upward or downward as flight objectives may require, immediately upon the flap reaching the position shown in Figure 4, the extension and rotation of the flap being component parts of a continuously executed control movement.

The control system may in fact be designed to extend and rotate the flap simultaneously instead of sequentially to deflect the extended flap either upward or downward in lieu of or in addition to extending and holding the flap in the Figure 4 position.

In any event, to both extend and deflect the flap involves concomitant extension and rotational movements. If the control system permits the flaps, full span, or outboard section only, to be held in the Figure 4 position, aileron movement to the up-aileron position 112 and down-aileron position 114 is provided at least for the outboard flap sections.

The control mechanism of links, rods, and pivots shown in the drawings is such that the rotation of the flap does not change the position of the interfoil 80, the latter changing its position solely in accompaniment to movements of extension or retraction of the flap. This condition satisfies the usual aerodynamic requirements of the flight regimes. If desired for any particular aerodynamic results, the control system and the connections of the interfoil may, of course, be arranged to move the interfoil angularly up and down with the flap as the latter is deflected in these directions.

Figure 5:
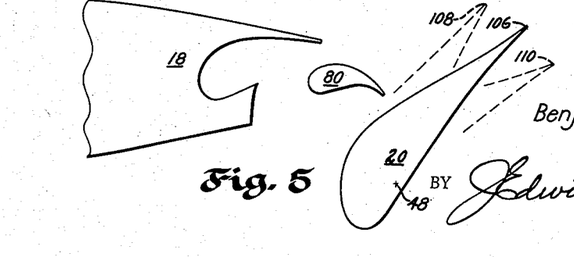
Figure 5 is a diagrammatic view of an inboard section of the wing structure with the flap in an upwardly deflected position for airplane deceleration.

If the flap is rotated to deflect it upwardly as indicated in full lines at position 106 on Figure 5, the drag coefficient is increased with an inconsequential change in the angle of attack and in the pitching movement coefficient at a given lift coefficient. In a typical wing structure embodying the invention, with the flap in position 106, the section drag coefficient was found to be increased about .27 over its value with the flap in the Figure 2 position, accompanied by a 1° lowering of the angle of attack and a change of but .04 of the section pitching moment coefficient at a given section lift coefficient.

An increase in the angle of upward deflection, as for instance, to position 108 or a decrease as to position 110 correspondingly varies the drag coefficient approximately in a constant ratio with the angle of deflection from the Figure 4 position of the flap. If the interfoil 80 is moved upwardly with the flap by the control system so as to eliminate mechanical interference, the flap may be thus upwardly deflected to an extreme angle of 90° with a corresponding increase in the drag coefficient.

As will be brought out in describing the particular control system disclosed herein, the inboard flap sections only are adjustable to positions of simultaneous upward deflection, the outboard flap sections remaining available for simultaneous downward deflection or for aileron deflection to produce other results in flight performance.

Figure 9:
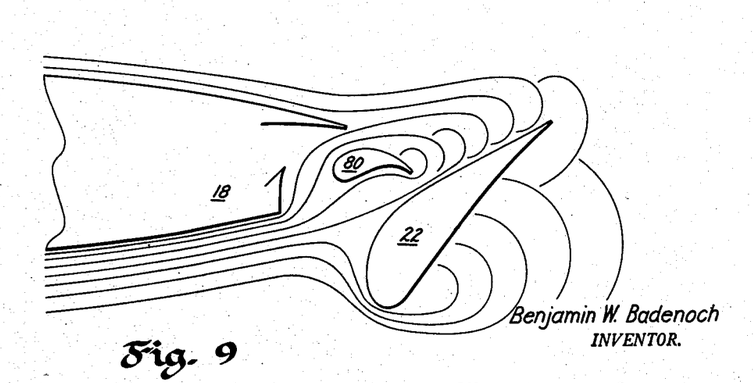
Figure 9 is a diagrammatic view illustrating the airflow adjacent the several airfoils of a wing structure of this invention with the airfoils in the position of adjustment shown in Figure 5.

Figure 9 shows the airflow about the airfoil of the wing structure when its three components are in the position of Figure 5. The interfoil 80 is positioned to direct air at a high angle of incidence against the upper surface of the flap 22, breaking up the airflow therealong and setting up a turbulence which increases the drag somewhat over that which would be caused by the flap without the interfoil so positioned.

Figure 6:
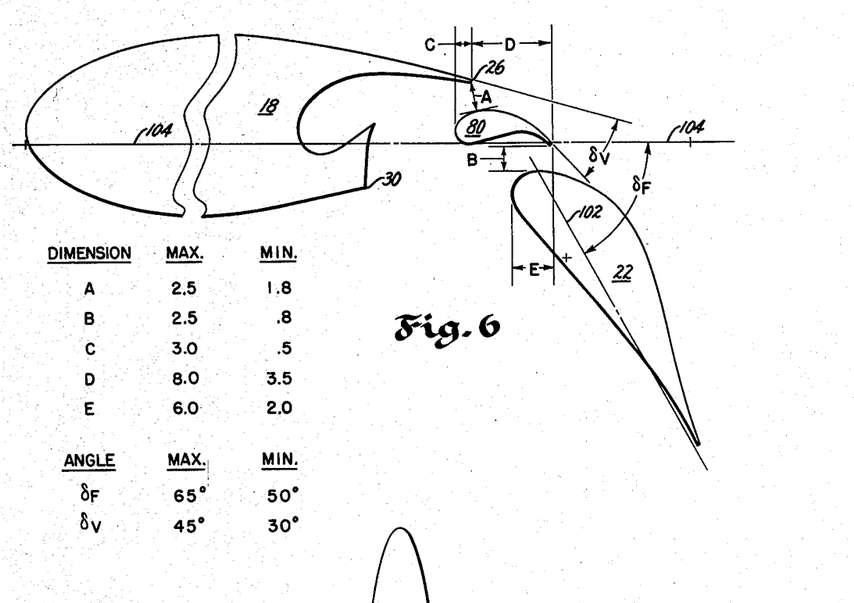
Figure 6 is a diagrammatic view of the wing structure with the flap in the extended and substantially downwardly deflected position.

If the control system is so operated as to deflect the flap downward by thrusting the rods 60 rearward when the flap has been extended to the Figure 4 position or during the extension movement, the airfoil components take the position shown in Figure 6, the interfoil having the same position relative to the fixed airfoil which it occupies in Figure 5.

Figure 7:
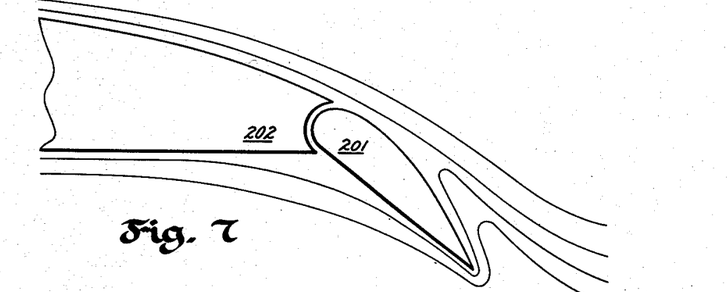
Figure 7 is a diagrammatic view illustrating the airflow adjacent the main airfoil and the flap of a standard plain flap type of wing structure.
Figure 8:
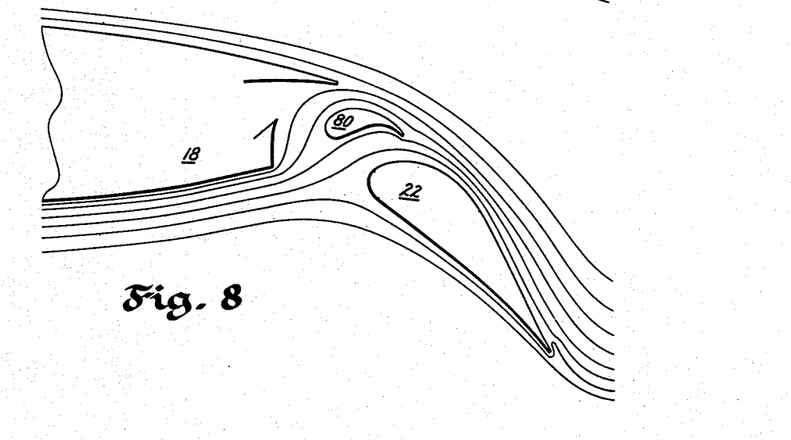
Figure 8 is a diagrammatic view illustrating the airflow adjacent the several airfoils of a wing structure of this invention with the airfoils in the position of adjustment shown in Figure 6.

In the Figure 6 position, a high lift coefficient is attained with a small increase in drag and a small increase in the moment coefficient. The airfoil area is increased by a few per cent. The airfoil camber is increased, and the airflow over all three components is smooth and uninterrupted. Figure 7 shows by comparison the turbulence in airflow above the trailing end of a downwardly deflected conventional plain flap 201 mounted to the rear of a main airfoil 202. Figure 8 shows the smooth flow which is characteristic of a wing structure of this invention in the downwardly deflected flap position of Figure 6.

The interfoil 80 is shaped and relatively positioned to produce this characteristic airflow. It is disposed in the slot between the fixed airfoil and flap so as to increase the lift area, since its movement of extension and orientation is such that it presents a supporting surface in the slot between the lip 26 and the nose of the fully extended flap. At the same time it directs the airflow from both upper and lower surfaces of the wing proper in a laminar stream along the upper surface of the flap which stream extends without separation from the flap surface virtually all the way to the trailing edge.

It will be observed that as the flap moves aft, the interfoil moves relative to both the wing proper and the flap. In the particular design shown in the drawings, while the chord line of the flap, as the flap is extended, remains substantially parallel to the chord line of the fixed airfoil (see Figures 2 and 4), the chord line of the interfoil rotates clockwise, and while the center of area of the airfoil section of the flap moves aft and downward, the center of area of the interfoil moves aft without appreciable vertical displacement, and with a horizontal displacement which is somewhat greater than that of the center of area of the flap. In any event, in any design of a wing structure of this invention, the flap, interfoil, and wing must be so shaped and be so relatively moved that when the flap is in extended position, the interfoil will provide a lift area between the wing and flap which will both by itself and by its effect on the adjacent wing and flap increase the effective areal factor of the lifting capacity of the wing structure and will so control the airflow as to substantially prevent air separation on both wing and flap surfaces while itself having no substantial air separation on its own surfaces.

Certain dimensions of the aircomponents, the relative orientation of the components in the extended position and certain distances between them in this position are quite critical for the attainment of maximum lift coefficient with low drag and low moment coefficient. These quantities are indicated on Figure 6 and there are tabulated on the drawing below Figure 6 the maximum and minimum values of these quantities in per cent of the chord line 104 of the entire airfoil, above or below which respectively the lift coefficient shows a substantial decline. The values in this table are predicated upon the length of the flap chord being approximately 25, the length of the vane chord being approximately 10, the chordwise spacing of the lips 26 and 30 being approximately 5 (all in per cent of the chord line 104 of the entire airfoil) the displacement of the flap rotative axis 48 from its leading edge as being between 17% and 5% of the flap chord and its displacement from the flap chord line as being between 5 and 10% of the flap chord.

If the wing structure is in the high speed configuration shown in Figure 2 and it is desired to change the angle of attack for the speed of this configuration, if the flap is extended and deflectively rotated downward, the angle of attack may be varied up to approximately 25% depending upon the angle of downward deflection.

Figure 10:
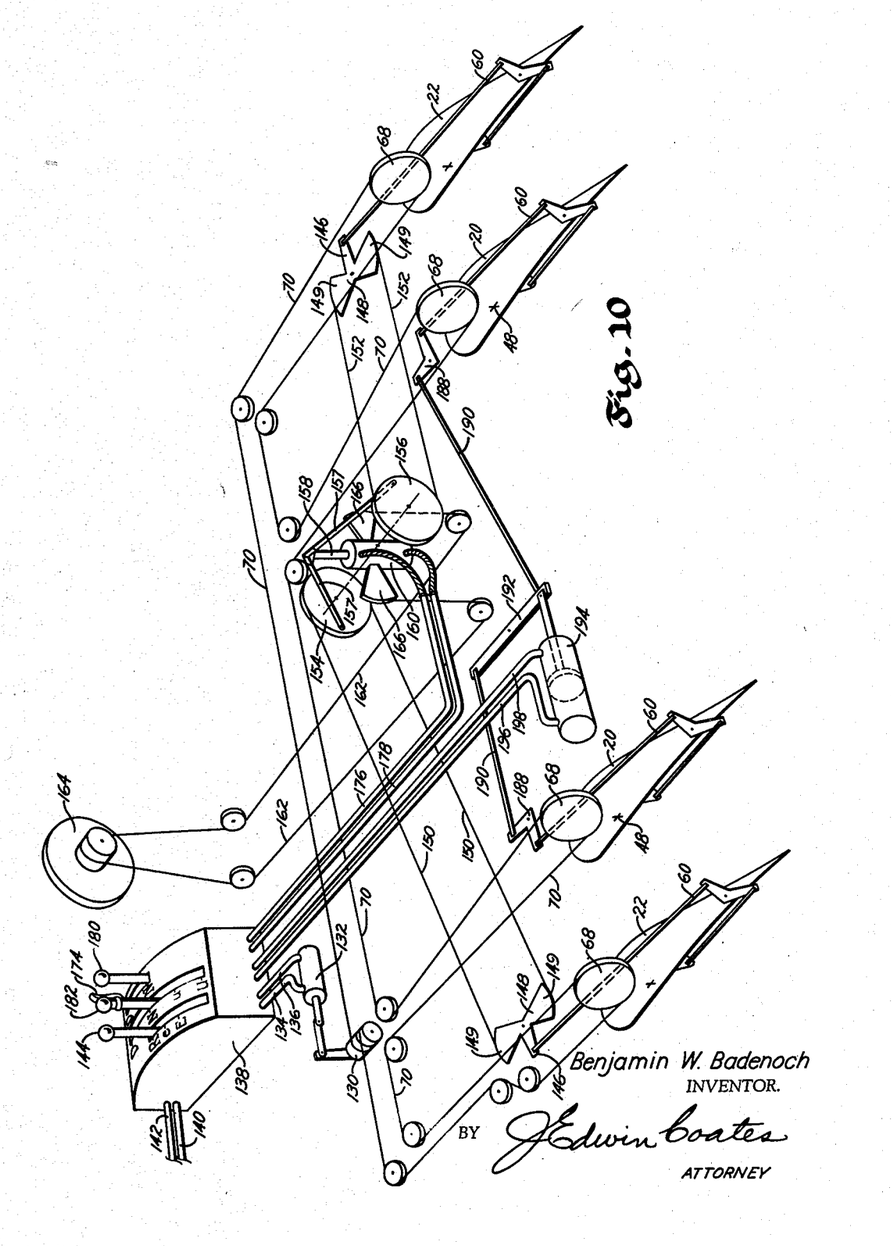
Figure 10 is a perspective schematic view of the control system of the wing structure.

The control system shown in Figure 10 is designed to extend all flap sections simultaneously without changing their angle of deflection, to deflect all flap sections downwardly from the horizontal simultaneously whether retracted or extended, to deflect in aileron fashion the outboard flap sections only irrespective of the retraction or extension or angle of deflection of the flaps, and to extend, if not already extended, all the flap sections and concomitantly deflect upwardly the inboard sections only and if desired, deflect downwardly at any angle or in aileron fashion the outboard sections while the inboard sections are thus deflected upwardly.

Referring to Figure 10, the outboard flaps 22 and the inboard flaps 20 are simultaneously retracted or extended by rotation of the sheaves 68 around all of which passes the endless cable 70. Cable 70 is reciprocatively moved in opposite directions by rotative movement of the drum 130 imparted to it by the hydraulic strut 132. The piston of this hydraulic strut is moved in either direction by fluid under pressure conducted to it in the conduits 134 and 136 which are reversibly connected by a four-way valve (not shown) in the housing 138 to the high pressure and accumulator conduits 140 and 142. The four-way valve is part of a master unit controlled by a pilot's lever 144, the unit operating the slave unit, i. e., the hydraulic strut 132, to move and hold the flaps in either fully extended or fully retracted position when the lever 144 is moved to either of the two positions E or R respectively. The details of construction of this control mechanism are not shown, being well known in the art, and such as are shown in the patent to Wheelon 2,292,916. If desired, additional intermediate positions such as that marked e may be provided for partial extension of the flaps.

The control rods 60 which determine the angular deflection of the outboard flaps 22 about their axes 48 are pivotally connected to the levers 146 which are in turn oscillatably movable on their fixed pivot axes by the sector sheaves 148 fixedly associated with the levers 146.

A cable 150 is attached at one of its ends to one of the arms 149 of one of the sector sheaves 148, and after passing around a sheave 154 is attached at its other end to the other arm 149 of this sector sheave 148. A cable 152 is similarly disposed around sheave 156 and secured to the arms 149 of the sector sheave 148 associated with the other outboard flap 22. The sheaves 154 and 156, which are coaxially mounted and independently rotatable, are turned in opposite directions by connecting rods 157, when these connecting rods are moved upwardly together or downwardly together by a piston rod 158 of the hydraulic strut 160. The piston of this strut is reversibly actuated by fluid pressure in the conduits 176 and 178 under the control of a lever 180 in the housing 138, which operates a four-way valve in the well-known manner to reversibly connect the conduits 176 and 178 with the high pressure and accumulator low pressure conduits 140 and 142.

When the lever 180 is moved from a neutral position N toward position D it adjusts the four-way valve to lower the piston rod 158 and rotate the sheaves 154 and 156 in directions to move levers 146 and their rods 60 aft to downwardly deflect the outboard flaps 22. Downward or upward movement of the flap is halted at the angle of deflection corresponding to the position of the lever by a master-unit device controlling the slave unit, the hydraulic strut 160.

Control rods 60 of the inboard flaps 20 are similarly reciprocatively moved by a power train comprising bell cranks 188, links 190, a centrally fulcrumed lever 192, hydraulic strut 194, and conduits 196 and 198, under the control of a four-way valve lever 182.

This lever 182, however, may be moved from the N position toward U position to deflect the flap to any desired position of upward deflection, as well as toward the D position for downward deflection.

Lever 182 is normally locked to move the lever 180 but may be readily disengaged therefrom as by a finger operated spring loaded latch 174 for independent movement toward the U position from the N position or from any position between D and N, to throw the inboard flaps into a brake position of upward deflection. When the lever 182 is returned into engagement with lever 180 it is prevented by a stop on the latter lever from moving beyond it and is automatically latched into locked relation therewith. If desired, the angle of deflective movement of the inboard flaps may be made slightly greater than the angle of deflective movement of the outboard flaps for equal travel movement of the levers 180 and 182 so that when all flaps are in extreme down position the outboard flaps may have an additional angular range increment downward for effective down-aileron movement.

When lever 182 is disengaged from lever 180 and moved toward the U position, an arm thereon within the housing 138 engages and is latched to lever 144 as it passes the N position and moves lever 144 with it. Lever 144, after completing only an initial small fractional portion of its travel, reaches position E at which it actuates the master unit under its control to operate the strut 132 to fully extend the flaps. Its further movement after passing the position E is an idle movement without any controlling function.

Lever 182, while lever 144 is moving from R to E, is moving idly from N to position U at which position it begins operation of the valve which controls hydraulic strut 194. This arrangement prevents the pilot inadvertently operating the controls for placing the inboard flaps simultaneously at an angle of upward deflection, and in the retracted position. During the return movement of lever 182 it carries lever 144 with it, automatically releasing lever 144 when the levers reach the N and R positions respectively. Lever 182 may take the form of a spring retrieved foot pedal which is connected to travel with lever 180 through the upper half of its travel range embracing the down flap positions and which may be disengaged from that lever by a pressure button on the pedal which is depressed by the pilot's foot when he pushes the pedal downward through the lower half of its travel range embracing the up flap positions. The foot pedal is connected to the lever 144 as related above in connection with the description of the connective relationship of levers 182 and 144.

Aileron movement of the outboard flaps only is provided for in the control mechanism. The hydraulic strut 160 is mounted to oscillate on a transverse axis intermediate its ends. This axis is the axis of rotation of the sheaves 154 and 156. Oscillation of the strut on this axis is effected by a cable 162, which passes around a drum on aileron wheel 164 and the two ends of which are secured to two sector arms 166 respectively which project from opposite sides of the cylinder of the hydraulic strut 160. Turning the aileron wheel 164 will obviously elevate one connecting rod 157 while lowering the other connecting rod, turning the sheaves 154 and 156 in the same direction and deflecting the flaps in opposite directions.

The operation of the control system becomes evident from the preceding description. With levers 180 and 182 at N and lever 144 at R as shown in Figure 10, the flaps, full span, are in the low lift, low drag, high speed regime position of Figure 2. Aileron movement of the outboard flaps is effected by turning the wheel 164. If lever 180 be moved from N toward D it carries lever 182 with it, deflecting all the flaps downward to an angular position corresponding to the lever position, occupying the low drag, medium lift, medium speed position of Figure 3. Aileron movement of the outboard flaps is effected as before.

With the levers 180 and 182 in any position between N and D, the lever 144 may be moved to position E extending all the flaps to the high lift position of Figure 6 in which as before the outboard flaps may be deflected in aileron fashion. With the two levers 180 and 182 in any position between N and D and lever 144 in the R or E position, the inboard flaps may be placed in the flight braking position of upward deflection by disengaging lever 182 from 180 and moving it to the desired position between N and U, lever 144, if not already there, being carried with it to position E to extend all the flaps. When lever 182 is returned it will move lever 144 back to R and will engage and become locked to lever 180, wherever lever 180 may be.

To change the attitude when the flaps are retracted in high speed flight, lever 144 is moved to the E position and lever 180 carrying with it lever 182 is moved toward the D position as far as is needed to bring about the desired change in the angle of attack.

I claim:

1. In an aircraft wing structure, the combination of: right and left wings; a trailing flap for each wing pivotally movable about a spanwise axis; adjustable mounting means on each wing for its associated flap; a control means for said mounting means to selectively move the flap so as to move its axis in a generally aft and substantially downward direction to positions between and including an extreme retracted position in which the flap is proximately adjacent the wing and an extreme extended position of substantial aft displacement of the flap from the wing; additional and independently acting control means for pivotally and concurrently adjustably moving the flaps about their axes in the same direction of rotation operable at any of the positions of the axes to vary the lift and drag coefficients of the wing structure; an interfoil pivotally mounted in each wing structure for rearward, and forward-return, movement and normally lying forward of said flap in an aerodynamically inactive position and attitude when said flaps lie adjacent said wing; a connector extending between the pivotally mounted interfoil and the main wing and connected to both the latter members so as to rotate the interfoil into a lift-generating position on rearward movement thereof; and means coordinated with said control means for shifting said interfoil rearwardly and pivotally from its inactive position to an active position and into an attitude in which the interfoil constitutes an auxiliary wing itself generating lift augmenting the lift of the main wing as an aerodynamically integral part thereof aerodynamically interactive with the adjacent portions of the main wing and of the flap to increment the lift coefficient of the latter two members.

2. In an aircraft wing structure, the combination of: right and left wings each having a truncated trailing edge; a trailing flap for each wing pivotally movable about a spanwise axis; adjustable mounting means on each wing for its associated flap; a control means for said mounting means to selectively move the axis in a generally aft and substantially downward direction from an extreme retracted position in which the flap is proximately adjacent the wing and in slot closing relation therewith and forming a faired continuation of at least one of the upper and lower surfaces of the wing to a slot forming extreme extended position of substantial aft displacement of the flap from the wing; additional and independently-functioning control means for pivotally and concurrently adjustably moving the flaps about their axes in the same direction of rotation operable in at least the two extreme positions of the axes to vary the lift and drag coefficients of the wing structure; an interfoil normally lying sheathed within the confines of the main wing forward of said flap in an areodynamically inactive position when said flaps lie adjacent said wing; a link extending from said interfoil to said main wing and pivoted at each end to the adjacent one of these members; an arm fixed to said interfoil and extending into pivotal connection with said flap; and means coordinated with said control means for shifting said interfoil rearwardly and pivotally from said inactive position and for causing said arm and said link to constrain said interfoil into a rearward position and attitude sufficiently close to the upper surface and trailing edge of said wing to constitute the interfoil an auxiliary wing aerodynamically integral with the main wing thereby to augment the total lift thereof, said interfoil then also aerodynamically interacting with the adjacent portion of said wing and said flap to increment the lift coefficient of these latter two members.

3. In an aircraft wing structure, the combination of: a wing having a truncated trailing edge and a spanwise recess between its upper and lower surfaces and extending forward from said truncated trailing edge; a trailing flap pivotally movable about a spanwise axis; adjustable mounting means on the wing for the flap; a control means for said mounting means to selectively move the flap so as to move its axis in a generally aft and substantially downward direction from a retracted limit position in which the flap is proximately adjacent the wing and with at least one of its upper and lower surfaces in faired slot-closing relation with the corresponding surface of said wing, to a slot forming extended limit position of substantial aft displacement of the flap from the wing; an interfoil for forming a double slot between the wing and flap when the flap is in extended position; a means coordinated with said control means for moving the interfoil from a forward aerodynamically ineffective position forward of said flap and within said recess when the axis is in its retracted limit position to an aft position forming said double slot when the flap is in extended position, the interfoil being shaped with a downwardly curved trailing lip and dimensioned, and in said extended position, related to the wing and flap, to arrange the lip generally tangential to the upper surface of the flap to cooperate with said slots to substantially decrease air separation on the upper surfaces of the wing and flap in downwardly deflected positions of the flap; and additional and independently functioning control means for pivotally adjustably downwardly deflecting the flap about its axis in retracted and extended positions of the axis to vary the lift coefficient of the structure.

4. In an aircraft wing structure, the combination of: a wing having a truncated trailing edge and a spanwise recess between its upper and lower surfaces and extending forward from said truncated trailing edge; a trailing flap pivotally movable about a spanwise axis; adjustable mounting means on the wing for the flap; a control means for said mounting means to selectively move the flap so as to move its axis in a generally aft and substantially downward direction from a retracted position in which the flap is proximately adjacent the wing and with at least one of its upper and lower surfaces in faired slot-closing relation with the corresponding surface of said wing, to a slot forming extended position of substantial aft displacement of the flap from the wing; an interfoil for forming a double slot between the wing and flap when the flap is in extended position; a means coordinated with said control means for moving the interfoil from a forward aerodynamically ineffective position forward of said flap and within said recess when the axis is in its retracted position to an aft position forming said double slot when the flap is in extended position, the truncated wing, the interfoil and the flap being shaped, relatively dimensioned and in the extended position, relatively oriented to constitute in effect three separate airfoils mutually helpful in increasing lift capacity without increasing air separation on their respective air surfaces; and additional and independently functioning control means for pivotally adjustably moving the flap about its axis in the retracted and extended positions of the axis to vary the lift coefficient of the structure.

5. In an aircraft wing structure, the combination of: a wing having a truuncated trailing edge and a spanwise recess between its upper and lower surfaces and extending forward from said truncated trailing edge; a trailing flap pivotally movable about a spanwise axis; adjustable mounting means on the wing for the flap; a control means for said mounting means to selectively move the flap so as to move its axis in a generally aft and substantially downward direction from a retracted position in which the flap is proximately adjacent the wing and with at least one of its upper and lower surfaces in faired slot closing relation with the corresponding surface of said wing, to a slot forming extended position of substantial aft displacement of the flap from the wing; an interfoil for forming a double slot between the wing and flap when the flap is in extended position; a means coordinated with said control means for moving the interfoil from a forward aerodynamically ineffective position forward of said flap and within said recess when the axis is in its retracted position to an aft position forming said double slot when the flap is in extended position, the interfoil being shaped and relatively dimensioned and in the extended position of the flap in a relative position to lower the pressure on the upper surfaces and increase the pressure on the lower surfaces of the wing and flap; and additional and independently functioning control means for pivotally adjustably moving the flap about its axis in the retracted and extended positions of the axis to vary the lift coefficient of the structure.

6. The combination defined in claim 3 in which said last mentioned means operates independently of said coordinated control means.

7. The combination defined in claim 3 in which the chord of said flap is approximately 25% of the chord of said wing structure.

8. The combination defined in claim 3 in which the trailing edges of the upper and lower surfaces of the wing are aft the laminar boundary layer of said wing.

9. The combination defined in claim 3 in which said axis is intermediate and remote from the leading and trailing edges of the flap and said additional control means may cause upward disposition of the trailing edge of the flap at appreciable angles to the wing chord line, and said additional control means operates independently of said coordinated control means, the lip of said interfoil in said latter relative position directing air flow against the upper surface of the flap at a substantial angle of incidence to create turbulence aft the incidence of said air flow.

10. The combination defined in claim 3 in which said wing structure is on one side of an aircraft and in addition thereto; a second similar wing structure on the other side of the aircraft similarly controllable concurrently with said first wing structure by said several control means; and means for concurrently moving the flaps of both wing structures about their axes in opposite directions in any operative position of adjustment of the flaps.

11. The combination defined in claim 3 in which said wing structure is on one side of an aircraft and in addition thereto; a second similar wing structure on the other side of the aircraft similarly controllable concurrently with said first wing structure by said several control means, the said flaps of said two wing structures each having an inboard and an outboard section; and means for concurrently moving the outboard flaps only of both wing structures about their axes in opposite directions in any operative position of adjustment of the axes and in any lift-varying rotative position of adjustment of said outboard flaps.

12. The combination defined in claim 3 in which said axis is intermediate and substantially displaced from the leading and trailing edges of the flap and the said flap has an inboard and an outboard section and said interfoil moving means operates independently of said additional control means, and said additional control means for pivotally and concurrently adjustably moving the flap about its axis is capable of separate adjustment of said inboard flap independently of any pivotal adjustment of the outboard flap when said flap is in its extended position to cause upward disposition of the trailing edge of the inboard flap at substantial angles to the wing chord line, the lip of said interfoil in said latter relative position directing air flow against the upper surface of the flap at a substantial angle of incidence to create turbulence aft the incidence of said air flow, said wing structure being on one side of an aircraft and in addition thereto; a second similar wing structure on the other side of the aircraft similarly controllable concurrently with said first wing structure by said several control means; and means for concurrently moving the outboard flaps only of both wing structures about their axes in opposite directions in any operative position of adjustment of said axes and in any lift-varying rotative position of adjustment of said outboard flaps.

13. In an aircraft wing structure, the combination of: a wing having a truncated trailing edge and a spanwise recess between its upper and lower surfaces and extending forward from said truncated trailing edge; a trailing flap pivotally movable about a spanwise axis; adjustable mounting means on the wing for the flap; a control means for said mounting means to selectively move the flap so as to move its axis in a generally aft and substantially downward direction from a retracted position in which the flap is proximately adjacent the wing with its nose disposed in said recess and with at least one of its upper and lower surfaces in faired slot closing relation with the corresponding surface of said wing, to a slot forming extended position of substantial aft displacement of the flap from the wing; an interfoil for forming a double slot between the wing and flap when the flap is in extended position; a means coordinated with said control means for moving the interfoil from a forward position when the flap is in its forward position to an extended position when the flap is in an extended position, the interfoil having an upwardly curved median line and a downwardly curved trailing lip, the relative dimensions of the wing interfoil and flap being such that the flap chord line is approximately one fourth the retracted airfoil chord line, the interfoil chord line parallel to the airfoil chord line is approximately one tenth the retracted airfoil chord line, the chordwise displacement of the lip of the upper surface of the wing being approximately 5% of said airfoil chord rearward from the lip of the wing lower surface, the dimensions, shape and orientation of the wing, interfoil and flap when the flap is fully extended and has a downward deflection between 50° and 65° being such that the upper surface of the interfoil in its extended position is disposed at a displacement distance from the trailing lip of the upper surface of the wing which has a value between 1.8% and 2.5% of the airfoil chord of the retracted wing structure, the nose of the interfoil is chordwise displaced forwardly of said trailing wing lip between .5% and 3% of said airfoil chord and the trailing interfoil lip is chordwise displaced aft of the said trailing wing lip between 3.5% and 8% of said airfoil chord, said trailing interfoil lip is vertically displaced from the nose of the flap .8% to 2.5% of said airfoil chord and horizontally displaced aft therefrom 2% to 6% of the airfoil chord and the tangent lines to the upper surfaces of the wing and interfoil at the trailing lip thereof form an angle between 30° and 45°, and additional and independently functioning control means for pivotally adjustably moving the flap about its axis in the retracted and extended position of the axis to vary the lift coefficient of the structure.

14. In an aircraft wing structure, the combination of: right and left wings each having a truncated trailing edge; a trailing flap for each wing pivotally movable about a spanwise axis; adjustable mounting means on each wing for its associated flap; a control means for said mounting means to selectively move the axis in a generally aft and substantially downward direction from an extreme retracted position in which the flap is proximately adjacent the wing and in slot closing relation therewith and forming a faired continuation of at least one of the upper and lower surfaces of the wing to a slot forming extreme extended position of substantial aft displacement of the flap from the wing; additional and independently functioning control means for pivotally and concurrently adjustably moving the flaps about their axes in the same direction of rotation operable in at least the two extreme positions of the axes to vary the lift and drag coefficients of the wing structure; a self-energizing interfoil mounted in each wing-structure forward of said flap to lie in an aerodynamically unexposed and inactive position when said flaps are proximately adjacent said wing; and means coordinated with said control means for independently shifting said interfoil rearwardly and pivotally from its forward aerodynamically unexposed and inactive position to a position forming a double slot between the wing and the flap and into an attitude constituting the theretofore aerodynamically non-existent airfoil a temporary wing occupying a location between the fixed wing and the flap with its center of area lying in substantially the same horizontal plane occupied thereby in its forward disposition so as to leave the median line and geometrical camber of the wing-structure substantially unaltered thereby, while independently exerting lift and interactively increasing the lift-coefficient of the adjacent main wing and flap, each flap having inboard and outboard sections, and said means for pivotally and concurrently adjustably moving the flaps about their axes being capable of separate upward adjustment of said inboard flaps independently of any concurrent pivotal adjustment of the outboard flaps, and when the inboard flaps are in a substantially extended position only, to effect concurrent upward disposition of the trailing edges of the inboard flaps at an appreciable angle to the wing chord line to positions coacting with said interfoil to enable said flaps to aerodynamically decelerate the craft in a dive.

15. In an aircraft wing structure, the combination of: a wing having a truncated trailing edge and a spanwise recess between its upper and lower surfaces and extending forward from said truncated trailing edge; a trailing flap pivotally movable about a spanwise axis; adjustable mounting means on the wing for the flap; a control means for said mounting means to selectively move the flap so as to move its axis in a generally aft and substantially downward direction from a retracted limit position in which the flap is proximately adjacent the wing and with at least one of its upper and lower surfaces in faired slot-closing relation with the corresponding surfaces of said wing, to a slot forming extended limit position of substantial aft displacement of the flap from the wing; an interfoil for forming a double slot between the wing and flap when the flap is in extended position; a means coordinated with said control means for moving the interfoil from a forward aerodynamically ineffective position forward of said flap and within said recess when the axis is in its retracted limit position to an aft position forming said double slot when the flap is in extended position, the interfoil being shaped with a downwardly curved trailing lip and being so dimensioned relatively to said wing and flap, and in said extended position, being so spatially related to the wing and flap, as to arrange the lip generally tangential to the upper surface of the flap to cooperate with said slots to substantially decrease air separation on the upper surfaces of the wing and flap in downwardly deflected positions of the flap; and additional and independently functioning control means for pivotally adjustably downwardly deflecting the flap about its axis in retracted and extended positions of the axis to vary the lift coefficient of the structure, the last mentioned control means being spatially organized with said flap to apply operating forces on same from above same and both separately from and concurrently with said coordinated interfoil control means.

16. In an aircraft wing structure, the combination of: a wing having a truncated trailing edge and a spanwise recess between its upper and lower surfaces and extending forward from said truncated trailing edge; a trailing flap pivotally movable about a spanwise axis; adjustable mounting means on the wing for the flap; a control means for said mounting means to selectively move the flap so as to move its axis in a generally aft and substantially downward direction from a retracted limit position in which the flap is proximately adjacent the wing and with at least one of its upper and lower surfaces in faired slot-closing relation with the corresponding surface of said wing, to a slot forming extended limit position of substantial aft displacement of the flap from the wing; an interfoil for forming a double slot between the wing and flap when the flap is in extended position; a means coordinated with said control means for moving the interfoil from a forward aerodynamically ineffective position forward of said flap and within said recess when the axis is in its retracted limit position to an aft position forming said double slot when the flap is in extended position, the interfoil being shaped with a downwardly curved trailing lip and dimensioned, and in said extended position, related to the wing and flap, to arrange the lip generally tangential to the upper surface of the flap to cooperate with said slots to substantially decrease air separation on the upper surfaces of the wing and flap in downwardly deflected positions of the flap; and additional and independently functioning control means for pivotally adjustably downwardly deflecting the flap about its axis in retracted and extended positions of the axis to vary the lift coefficient of the structure, said additional control means being adapted to effect upward deflection of the flap into a position establishing a spatial relationship to said interfoil enabling said lip to direct air flow against the upper surface of the flap at a substantial angle of incidence sufficient to create drag increasing turbulence thereon commencing forward of the center of area of said flap.

BENJAMIN W. BADENOCH.

REFERENCES CITED

The following references are of record in the file of this patent:

UNITED STATES PATENTS

| Number | Name | Date |
|---|---|---|
| 1,989,358 | Guthier | Jan. 29, 1935 |
| 2,117,607 | Griswold | May 17, 1938 |
| 2,207,402 | Gunter | July 9, 1940 |
| 2,207,453 | Blume | July 9, 1940 |
| 2,271,763 | Fowler | Feb. 3, 1942 |
| 2,289,704 | Grant | July 14, 1942 |
| 2,360,333 | De Port | Oct. 17, 1944 |

FOREIGN PATENTS

| Number | Country | Date |
|---|---|---|
| 521,190 | Great Britain | May 15, 1940 |